(12) United States Patent
Nam et al.

(10) Patent No.: US 9,304,239 B2
(45) Date of Patent: Apr. 5, 2016

(54) PREPARING METHOD FOR THIN POLARIZER, THIN POLARIZER AND POLARIZING PLATE COMPRISING THE SAME

(71) Applicant: LG CHEM, LTD., Seoul (KR)

(72) Inventors: Sung-Hyun Nam, Daejeon (KR); Jun-Geun Um, Daejeon (KR); Kyun-Il Rah, Daejeon (KR); Jong-Hyun Jung, Daejeon (KR); Hye-Min Yu, Daejeon (KR); Nam-Jeong Lee, Daejeon (KR); Sei-Jung Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 67 days.

(21) Appl. No.: 14/342,778

(22) PCT Filed: Nov. 14, 2013

(86) PCT No.: PCT/KR2013/010340
§ 371 (c)(1),
(2) Date: Mar. 4, 2014

(87) PCT Pub. No.: WO2014/077599
PCT Pub. Date: May 22, 2014

(65) Prior Publication Data
US 2015/0309234 A1  Oct. 29, 2015

(30) Foreign Application Priority Data

| Nov. 16, 2012 | (KR) | 10-2012-0130576 |
| Nov. 16, 2012 | (KR) | 10-2012-0130577 |
| Nov. 13, 2013 | (KR) | 10-2013-0137456 |

(51) Int. Cl.
*G02B 5/30* (2006.01)

(52) U.S. Cl.
CPC .................................. *G02B 5/3033* (2013.01)

(58) Field of Classification Search
CPC ...................................................... G02B 5/3033
USPC ...................................................... 359/487.02
See application file for complete search history.

(56) References Cited

U.S. PATENT DOCUMENTS

| 8,699,135 B2 | 4/2014 | Goto et al. | |
| 2004/0089960 A1* | 5/2004 | Isozaki | B29C 55/06 264/1.34 |

(Continued)

FOREIGN PATENT DOCUMENTS

| CN | 101309990 A | 11/2008 |
| CN | 102326105 A | 1/2012 |

(Continued)

OTHER PUBLICATIONS

CN Office action; Application No. 201380003123.4; dated Aug. 3, 2015.

(Continued)

*Primary Examiner* — Frank Font
(74) *Attorney, Agent, or Firm* — Dentons US LLP

(57) ABSTRACT

The present disclosure relates to a method for preparing a thin polarizer, and a thin polarizer prepared using the same, the method including forming a film laminate by attaching a non-stretched polyvinyl alcohol (PVA) film having a thickness of 10 to 60 µm to at least one surface of a non-stretched base film, using attractive force therebetween; and stretching the film laminate such that the thickness of the PVA film is 10 µm or less.

9 Claims, 5 Drawing Sheets

(56) References Cited

U.S. PATENT DOCUMENTS

| | | |
|---|---|---|
| 2006/0093809 A1 | 5/2006 | Hebrink et al. |
| 2008/0158675 A1* | 7/2008 | Fukushige ............ C08F 214/18 359/487.02 |
| 2008/0278810 A1 | 11/2008 | Kim et al. |
| 2009/0023911 A1* | 1/2009 | Hashimoto ............ B29C 41/26 536/56 |
| 2010/0202051 A1 | 8/2010 | Yoshimi et al. |
| 2010/0208344 A1 | 8/2010 | Lee et al. |
| 2010/0300611 A1* | 12/2010 | Yamamoto ................ B32B 7/06 156/248 |
| 2011/0315306 A1 | 12/2011 | Goto et al. |
| 2012/0281279 A1 | 11/2012 | Goto et al. |
| 2012/0300300 A1* | 11/2012 | Yasui ................... C09J 133/066 359/492.01 |
| 2013/0052457 A1* | 2/2013 | Inui ....................... C08F 265/06 428/336 |

FOREIGN PATENT DOCUMENTS

| | | |
|---|---|---|
| JP | 1976069644 A | 6/1976 |
| JP | 06-347641 A | 12/1994 |
| JP | 2008225090 A | 9/2008 |
| JP | 2009-042632 | 2/2009 |
| JP | 2010-224345 A | 10/2010 |
| JP | 2011-128486 A | 6/2011 |
| JP | 4975186 B1 | 4/2012 |
| JP | 2012-118521 | 6/2012 |
| JP | 2012-118521 A | 6/2012 |
| JP | 2012-159778 A | 8/2012 |
| JP | 2012-256018 A | 12/2012 |
| KR | 10-2007-0074642 | 7/2007 |
| KR | 10-2009-0051400 | 5/2009 |
| KR | 10-2009-0101762 | 9/2009 |
| KR | 10-2010-0071998 | 6/2010 |
| KR | 10-2011-0118825 | 11/2011 |
| TW | 201044033 A1 | 12/2010 |
| WO | 2010-100917 A1 | 9/2010 |

OTHER PUBLICATIONS

TW Office Action, Application No. 102141681, dated Oct. 29, 2015.
JP Office Action, Application No. 2014-548707, dated Nov. 4, 2015.

\* cited by examiner

PREPARING METHOD FOR THIN POLARIZER, THIN POLARIZER AND POLARIZING PLATE COMPRISING THE SAME

This application is a National Stage Entry of International Application No. PCT/KR2013/010340, filed Nov. 14, 2013 and claims the benefit of Korean Application No. 10-2012-0130576, filed on Nov. 16, 2012, Korean Application No. 10-2012-0130577, filed Nov. 16, 2012, and Korean Application No. 10-2013-0137456, filed Nov. 13, 2013 all of which are hereby incorporated by reference in their entirety for all purposes as if fully set forth herein.

TECHNICAL FIELD

The present disclosure relates to a method for preparing a thin polarizer, and a thin polarizer and a polarizing plate prepared using the same, and more particularly, a method for preparing a thin polarizer having a small thickness of 10 μm or less, and a thin polarizer and a polarizing plate prepared using the same.

BACKGROUND ART

Polarizers used in polarizing plates, optical devices enabling natural light or optional polarized light to be converted into polarized light in a certain direction, have been widely used in display devices such as liquid crystal displays and organic light emitting diodes. As a polarizer currently used in such display devices, a polyvinyl alcohol-based polarizing film containing an iodine compound or a dichroic dye and having molecular chains oriented in a predetermined direction has generally been used.

The polyvinyl alcohol-based polarizing film may be prepared by dyeing a polyvinyl alcohol film with iodine or a dichroic dye, and then stretching the film in a predetermined direction and crosslinking the film. In the case, the stretching process may be performed through wet stretching undertaken in a solution such as an aqueous boric acid solution or an aqueous iodine solution, dry stretching undertaken in the atmosphere, or the like, and a stretching magnification of 5 or more times may be generally provided. However, in such a preparing process according to the related art, a polyvinyl alcohol-based film needs to have a thickness exceeding 60 μm, prior to a stretching thereof, in order to perform stretching thereon without the occurrence of breakage. In a case in which the thickness of the polyvinyl alcohol-based film prior to the stretching is less than 60 μm, a degree of swelling in the polyvinyl alcohol-based film may be increased, and the modulus acting per unit area during the stretching process may be increased due to the small thickness, such that breakage of the film may easily occur.

Meanwhile, in accordance with the recent trend for the thinning of display devices, polarizing plates also need to have a reduced thickness. However, in a case in which a polyvinyl alcohol-based film having a thickness exceeding 60 μm is used according to the related art, reducing the thickness of a polarizer may be restricted. Therefore, research into manufacturing a polarizer having a reduced thickness has been carried out.

Korean Patent Laid-Open Publication No. 2010-0071998 discloses a method for manufacturing a thin polarizer using a laminate fabricated by coating a hydrophilic polymer layer on a base layer, or co-extruding a base layer-forming material and a hydrophilic polymer layer-forming material. However, in the case of a coating or co-extruding method, a polyvinyl alcohol layer and the base layer may not be easily separated after stretching, and in order to perform the separation thereof, a high degree of peeling strength may be required. Thus, defects such as damage to or a deformation in the polyvinyl alcohol layer may be easily generated in a separation process and consequently, optical properties such as a degree of polarization and the like, of a polyvinyl alcohol film, are deteriorated. Moreover, in the case of using the coating or co-extruding method, since the polyvinyl alcohol film is manufactured by melting a polyvinyl alcohol resin and then extruding a film, or is manufactured by preparing the resin as a coating solution and then coating the solution, properties of the correspondingly manufactured polyvinyl alcohol film may be easily changed depending on extruding conditions, coating conditions or film forming conditions. Thus, properties of the finally manufactured polyvinyl alcohol film may be deteriorated and further, uniform properties may not be implemented therein.

Furthermore, Japanese Patent Laid-Open Publication No. 2012-118521 discloses a method for manufacturing a thin polarizer by bonding a polyvinyl alcohol film to one surface of a base film using a water-based polyvinyl alcohol adhesive and then stretching the film. However, in a case in which the polyvinyl alcohol film and the base film are bonded to each other using an adhesive as described above, a considerable amount of fine wrinkles in the form of cracks may occur in surfaces of the films due to a difference between degrees of swelling in the base film and the polyvinyl alcohol film. Further, curling may be intensified prior to stretching, leading to increased instability in the process, and, during a stretching process, breakage of the film may be easily generated. Moreover, in the case of performing stretching after the base film and the polyvinyl alcohol film are attached to each other with an adhesive, a curling phenomenon may occur in edges of the films after the stretching.

DISCLOSURE

Technical Problem

An aspect of the present disclosure provides a method for preparing a thin polarizer having superior optical characteristics, while allowing for high process stability.

Technical Solution

According to an aspect of the present disclosure, a method for preparing a thin polarizer may include: forming a film laminate by attaching a non-stretched polyvinyl alcohol (PVA) film having a thickness of 10 to 60 μm to at least one surface of a non-stretched base film, using attractive force therebetween; and stretching the film laminate such that the thickness of the PVA film is 10 μm or less.

In this case, the base film may be a polymer film having a maximum stretching magnification of 5 or more times. By way of example, the base film may be at least one selected from a group consisting of a high density polyethylene film, a polyurethane film, a polypropylene film, a polyolefin film, an ester-based film, a low density polyethylene film, a co-extruded film of high density polyethylene and low density polyethylene, a copolymer resin having ethylene vinyl acetate contained in high density polyethylene, an acrylic film, a polyethylene terephthalate film, a polyvinyl alcohol film and a cellulose film.

Meanwhile, the attractive force between the non-stretched base film and the non-stretched PVA film may be about 0.1 to 2N/2 cm.

In addition, the stretching of the film laminate may be performed through dry stretching or wet stretching. Preferably, the stretching of the film laminate may be performed at a temperature of 20° C. to 85° C. at a stretching magnification of 5 to 15 times. Further, the stretching of the film laminate may be performed in an aqueous boric acid solution.

Meanwhile, the method for preparing a thin polarizer may further include dyeing the film laminate with at least one of iodine and a dichroic dye, prior to the stretching.

Meanwhile, the method for preparing a thin polarizer may further include separating the PVA film from the base film, after the stretching of the film laminate. In this case, the separating of the PVA film from the base film may be performed by applying peeling strength of 2N/2 cm.

According to another aspect of the present disclosure, a thin polarizer prepared by the method described above and having a thickness of 10 μm or less, a single transmittance of 40 to 45%, and a degree of polarization of 99% or more, and a polarizing plate including the thin polarizer may be provided.

Advantageous Effects

According to exemplary embodiments of the present disclosure, a thin polarizer having superior optical characteristics and a thickness of 10 μm or less may be prepared through a stable process.

BEST MODE

Exemplary embodiments of the present disclosure will now be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

As a result of repeated research in order to prepare a polarizer having superior optical properties while having a thickness of 10 μm or less, significantly low, without the occurrence of breakage during a preparing process, the inventors of the present disclosure found that the objects described above could be achieved by attaching a polyvinyl alcohol (PVA) film to a base film, using weak attractive force between the films without a medium such as adhesives or the like, and then stretching the films.

More particularly, a method for preparing a thin polarizer according to an embodiment of the present disclosure may include forming a film laminate by attaching a non-stretched PVA film having a thickness of 10 to 60 μm to at least one surface of a non-stretched base film, using attractive force therebetween; and stretching the film laminate such that the thickness of the PVA film is 10 μm or less.

Figure 1:
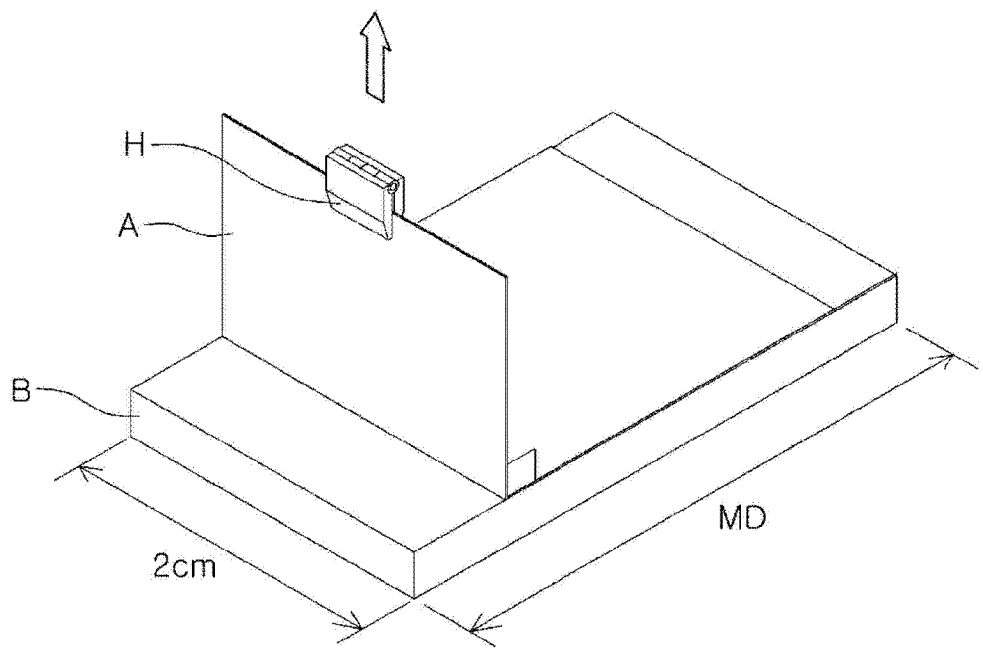
FIG. 1 is a view illustrating a method for measuring adhesion using a Texture Analyzer.

First, the film laminate may be formed by attaching the non-stretched PVA film to the non-stretched base film using attractive force therebetween, without a separate medium. In this case, the base film and the PVA film may be attached by weak attractive force occurring between surfaces of the base film and the non-stretched PVA film, without a separate medium, and the attractive force between the base film and the non-stretched PVA film is not limited, but may be 2N/2 cm or less, preferably, about 0.1 to 2N/2 cm, more preferably, about 0.1 to 1N/2 cm. When the attractive force between the base film and the non-stretched PVA film satisfies such a range, the base film and the non-stretched PVA film may not be separated during a stretching process, and damage in the surfaces thereof may be minimized during a separation process after stretching. In this case, the attractive force may refer to adhesion measured in the case of attaching sample films having a length of 2 cm, and a concrete measuring method thereof is illustrated in FIG. 1. In exemplary embodiments of the present disclosure, adhesion between the films refers to peel strength measured while a PVA film A of the film laminate is peeled off from a base film B by applying force in a direction perpendicular to a plane direction of the film laminate, after the PVA film A of the film laminate is fixed by a sample holder H, and in this case, a measuring device was a Texture Analyzer (Model name: TA-XT Plus) by Stable Micro Systems.

Meanwhile, in order to form an appropriate degree of adhesion between the base film and the PVA film at the time of stacking the films, a surface treatment may be performed on one or both surfaces of the base film or the PVA film. In this case, the surface treatment may be performed through various surface treatment methods commonly known in the technical field to which the present disclosure pertains, for example, a corona treatment, a plasma treatment, or a surface modification treatment using a strongly alkaline aqueous solution such as NaOH or KOH.

Meanwhile, the non-stretched PVA film may be attached to one surface or both surfaces of the non-stretched base film. In consideration of productivity and process stability, it may be preferable to attach the PVA film to both surfaces of the non-stretched base film. In the case of attaching the PVA film to both surfaces of the base film, adjusting balance of tension and the modulus acting per unit area during the stretching process may be facilitated, as compared to the case of attaching the PVA film to only one surface of the base film to thereby allow for superior process stability and further, two thin polarizers may be obtained through a single process to thereby improve productivity.

Meanwhile, the non-stretched base film is provided to prevent breakage of the PVA film, and preferably, may be a polymer film having a maximum stretching magnification of or more times under temperature conditions of 20° C. to 85° C. In this case, the maximum stretching magnification indicates a stretching magnification immediately before the occurrence of breakage. Meanwhile, the stretching may be dry stretching or wet stretching. In the case of wet stretching, the maximum stretching magnification may be obtained by performing stretching in an aqueous boric acid solution containing 1.0 to 5 wt % of a boric acid concentration.

The base film described above is not limited, but may be a high density polyethylene film, a polyurethane film, a polypropylene film, a polyolefin film, an ester-based film, a low density polyethylene film, a co-extruded film of high density polyethylene and low density polyethylene, a copolymer resin film having ethylene vinyl acetate contained in high density polyethylene, an acrylic film, a polyethylene terephthalate film, a polyvinyl alcohol film, a cellulose film, or the like, by way of example.

Next, the non-stretched PVA film attached to the base film may have a thickness of about 10 to 60 µm, preferably, a thickness of about 10 to 40 µm. When the thickness of the PVA film exceeds 60 µm, a polarizer having a thickness of 10 µm or less may not be implemented, even after stretching. When the thickness of the PVA film is below 10 µm, breakage may be easily generated therein during stretching.

Meanwhile, a degree of polymerization of the PVA film is not limited, but may be about 1,000 to 10,000, preferably, about 1,500 to 5,000. When the degree of polymerization satisfies this range, molecules may move freely and may be smoothly combined with iodine, a dichroic dye, or the like.

Meanwhile, the PVA film according to the embodiment of the present disclosure may be a commercially available PVA film, for example, PE20, PE30 or PE60 manufactured by Kuraray, M2000, M3000 or M6000 manufactured by Nippon Synthetic Chemical Industry Co., Ltd, or the like.

Meanwhile, the film laminate is formed by attaching the PVA film to the base film and is then stretched. In this case, the stretching may be performed such that the PVA film has a thickness of 10 µm or less, for example, a thickness of about 1 µm to 10 µm, 3 µm to 10 µm, or 1 µm to 5 µm.

Meanwhile, in the exemplary embodiment of the present disclosure, stretching conditions are not particularly limited, but for example, the stretching may be performed at a temperature of 20° C. to 85° C. at a stretching magnification of 5 to 15 times, preferably, at a temperature of 40° C. to 80° C. at a stretching magnification of 5 to 12 times.

In this case, the stretching may be performed through wet stretching or dry stretching. However, the performing of wet stretching may be preferable in that surface adhesion of the base film and the PVA film may be increased as compared to the case of dry stretching to thereby allow for stable stretching. Meanwhile, the wet stretching may be performed in an aqueous boric acid solution and in this case, the aqueous boric acid solution may contain about 1.0 to 5 wt % of a boric acid concentration.

When the stretching is performed in the aqueous boric acid solution as described above, a breakage occurrence rate in the PVA film may be lowered due to boric acid crosslinking, such that process stability may be enhanced and the occurrence of wrinkles in the PVA film, easily generated during a wet process, may be controllable. In addition, the wet stretching may be advantageously performed at a temperature lower than that of dry stretching.

Meanwhile, a process for preparing a polarizing element may generally include washing, swelling, dyeing, cleaning, stretching, complementing and drying processes, and the like. In the embodiment of the present disclosure, the cleaning and stretching processes may be performed in the aqueous boric acid solution. More particularly, in the cleaning process, the boric acid concentration may be about 0.1 to 2.5 wt %, preferably, about 0.5 to 2.0 wt %. In the stretching process, the boric acid concentration may be about 1.0 to 5.0 wt %, preferably, about 1.5 to 4.5 wt %.

Meanwhile, the stretching process may be performed together with at least one of a process of dyeing the PVA film with iodine and/or a dichroic dye and a process of crosslinking the iodine and/or the dichroic dye with the PVA film.

For example, the stretching may be performed in an aqueous solution containing iodine and/or a dichroic dye, and a boric acid, whereby the dyeing, crosslinking and stretching processes may be performed simultaneously. Alternatively, after the dyeing process has been performed by dipping the film laminate into an aqueous solution containing iodine and/or a dichroic dye prior to the stretching process, the dyed film laminate may be dipped into an aqueous boric acid solution and stretched therein, whereby the crosslinking and stretching processes may be performed simultaneously.

Meanwhile, after the film laminate is stretched described above, a process of drying the stretched film laminate may further provided, if necessary. In this case, the drying may be performed at a temperature of about 20° C. to 100° C., preferably, about 40° C. to 90° C., for 1 to 10 minutes. The drying process may serve to prevent a deterioration in properties of a PVA polarizer due to moisture during a preparing process of a polarizing plate, by removing moisture on or within a surface of the PVA film. In addition, the drying process may serve to smoothly induce a width contraction of the PVA film stretched during the drying thereof and to increase the orientation of a complex configured of polyvinyl alcohol and iodine, thereby improving the degree of polarization of the polarizer.

Meanwhile, after the film laminate is stretched as described above, a process of separating the PVA film from the base film may further provided, if necessary. The separating process may be performed by a method of detaching two films by applying peeling strength to the PVA film or the base film. In this case, the peeling strength may be 2N/2 cm or less, for example, about 0.1 to 2N/2 cm, or about 0.1 to 1N/2 cm. In the exemplary embodiment of the present disclosure, since the base film and the PVA film may be attached to each other by weak attractive force therebetween, without a separate medium such as an adhesive, the base film and the PVA film may be clearly separated from each other. Further, in the case, since a degree of peel strength required for separating the base film and the PVA film may be significantly low, as compared to the case of forming a PVA resin layer on the base film using a coating or co-extruding method, two films may be easily separated from each other without a separate process or device. Furthermore, damage to the PVA film may be low during the separating process to thereby exhibit significantly superior optical performance.

When the separating process as described above has been completed, a PVA polarizer having a thickness of 10 µm or less may be obtained. In the case of attaching the PVA film to both surfaces of the base film, two thin polarizers may be obtained through a single process. The polarizer prepared according to the method described above may have a thickness of 10 µm or less, significantly low, for example, a thickness of about 1 µm to 10 µm, 3 µm to 10 µm, or 1 µm to 5 µm. Even with such a significantly low thickness, the polarizer may have a single transmittance of about 40 to 45% and a degree of polarization of 99.0% or more, preferably, 99.5% or more, more preferably, 99.7% or more, which exhibits significantly superior optical properties.

Meanwhile, an exemplary embodiment of the present disclosure may provide a polarizing plate including the thin polarizer prepared by the method described above.

The polarizing plate according to the exemplary embodiment of the present disclosure may be formed by stacking a transparent film on one surface or both surfaces of the thin polarizer according to the exemplary embodiment described above. In this case, as the transparent film, various types of film used as a polarizer protective film or a retardation film in the technical field to which the present disclosure pertains may be used without limitation. By way of example, as the transparent film, films including at least one selected from a group consisting of a polyester-based polymer, a styrene-based polymer, a cellulose-based polymer, a polyethersulfone-based polymer, a polycarbonate-based polymer, an acrylic polymer, a polyolefin-based polymer, a polyamide-based polymer, a polyimide-based polymer, a sulfone-based polymer, a poly ether sulfone-based polymer, a polyether ether ketone-based polymer, a polyphenylene sulfide-based polymer, a vinyl alcohol-based polymer, a vinylidene chloride polymer, a vinyl butyral-based polymer, an arylate-based polymer, a polyoxymethylene-based polymer, an epoxy-based polymer, and a mixture thereof, may be used.

A method of stacking the polarizer and the transparent film is not particularly limited, but may be performed using an adhesive, a gluing agent or the like, commonly known in the technical field to which the present disclosure pertains. In this case, the adhesive or the gluing agent may be suitably selected by taking account of a material of the used transparent film. For example, in a case in which the transparent film is a triacetate cellulose (TAC) film, a water-based adhesive such as a PVA-based adhesive may be used therefor. In a case in which the transparent film is an acrylic film, a cycloolefin polymer (COP) film or the like, a photocurable adhesive such as an epoxy-based adhesive, or a thermosetting adhesive may be used therefor.

In addition, if necessary, the polarizing plate according to the exemplary embodiment of the present disclosure may further include an adhesive layer on the thin polarizer or the transparent film according to the exemplary embodiment. In this case, the adhesive layer may be formed by applying an adhesive composition including at least one selected from a group consisting of an acrylic copolymer, an epoxy-based resin, a polyurethane-based resin, a silicone-based resin, a polyether-based resin, a polyamide-based resin, and a polyvinyl alcohol-based resin, to the polarizer or the transparent film, irradiating light or heat thereon, and then performing curing thereon.

More particularly, the polarizing plate according to the embodiment of the present disclosure may include a PVA polarizer having a thickness of 10 μm or less, a transparent film attached to at least one surface of the PVA polarizer through a bonding layer, and an adhesive layer formed on the polarizer or the transparent film.

For example, the polarizing plate according to the exemplary embodiment of the present disclosure may include a PVA polarizer having a thickness of 10 μm or less, a transparent film attached to one surface of the PVA polarizer through a bonding layer, and an adhesive layer formed on the other surface of the PVA polarizer.

Meanwhile, if necessary, a primary layer, a bonding layer or the like may be further provided between the adhesive layer and the PVA polarizer and/or between the bonding layer and the transparent film in order to enhance adhesion therebetween.

MODE FOR DISCLOSURE

Hereinafter, the present disclosure will be described in detail with reference to concrete examples.

Inventive Example

A film laminate was formed by stacking a PVA film having a thickness of 30 μm (M3000 grade manufactured by Nippon Gohsei) on both surfaces of a thermoplastic polyurethane base film having a thickness of 60 μm. After the film laminate was swollen in a pure water solution at a temperature of 25° C. for 15 seconds, the film laminate was dyed in a solution having an iodine concentration of 0.3 wt % at 25° C. for 60 seconds. Then, after the film laminate was subjected to a cleaning process in a solution having a boric acid concentration of 1 wt % at 25° C. for 15 seconds, the film laminate was stretched at a magnification of 7 times in a solution having a boric acid concentration of 2.5 wt % at 52° C. After the stretching, the film laminate was subjected to a complementing process in a solution having a KI concentration of 5 wt %, and then was dried in an oven at 80° C. for 5 minutes. Thereafter, the polyurethane base film and the PVA film were separated from each other with peel strength of 0.7N/2 cm, while holding the polyurethane base film, such that a thin polarizer having a thickness of 7.5 μm was finally prepared.

Comparative Example 1

Figure 2:
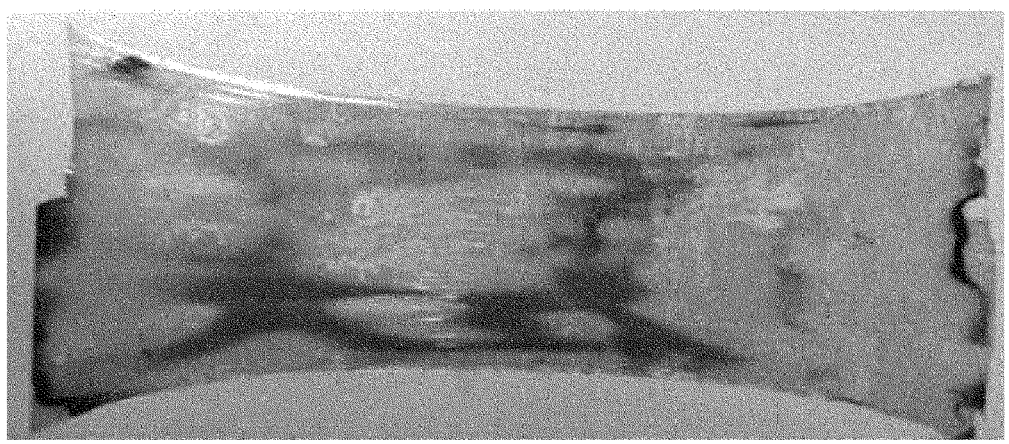
FIG. 2 is a view illustrating a state of a film laminate prepared according to a method of Comparative Example 1.

After an aqueous PVA solution was formed by dissolving a PVA film (M-grade manufactured by Nippon Gohsei, an average degree of polymerization: 2400, an average degree of saponification: 99 mol %) in pure water at 100° C., the aqueous PVA solution was coated on a PET film (NOVA-Clear SG007 grade manufactured by MGC Com.) having a thickness of 200 μm using a lip coater, and was dried in an oven at 80° C. for 10 minutes to thereby form a film having a PVA coating layer. In this case, a thickness of the PVA coating layer was 10 μm. The film was swollen in a pure water solution at 25° C. for 15 seconds and then, was dyed in a solution having an iodine concentration of 0.3 wt % at 25° C. for 60 seconds. Then, after the film was subjected to a cleaning process in a solution having a boric acid concentration of 1 wt % at 25° C. for 15 seconds, the film was stretched at a magnification of 5.5 times in a solution having a boric acid concentration of 2.5 wt % at 52° C. After the stretching, the film was subjected to a complementing process in a solution having a KI concentration of 5 wt %, and then was dried in an oven at 80° C. for 5 minutes. However, the PVA coating layer was taken off during the stretching, thereby leading to an inability to prepare a thin PVA film. FIG. 2 illustrates a state of the film prepared according to the method of Comparative Example 1.

Comparative Example 2

After an aqueous PVA solution was formed by dissolving a PVA film (M-grade manufactured by Nippon Gohsei, an average degree of polymerization: 2400, an average degree of saponification: 99 mol %) in pure water at 100° C., the aqueous PVA solution was coated on a PET base film (NOVA-Clear SG007 grade manufactured by MGC Com.) having a thickness of 200 μm using a lip coater, and was dried in an oven at 80° C. for 10 minutes to thereby form a film having a PVA coating layer. In this case, a thickness of the PVA coating layer was 10 μm. The film was swollen in an aqueous solution having a boric acid concentration of 1.0 wt % at 25° C. for 15 seconds and then, was dyed in a solution having an iodine concentration of 0.3 wt % and a boric acid concentration of 3.0 wt % at 25° C. for 60 seconds. Then, after the film was subjected to a cleaning process in a solution having a boric acid concentration of 1 wt % at 25° C. for 15 seconds, the film was stretched at a magnification of 5.5 times in a solution having a boric acid concentration of 2.5 wt % at 60° C. After the stretching, the film was subjected to a complementing process in a solution having a KI concentration of 5 wt %, and then was dried in an oven at 100° C. for 8 minutes. Thereafter, the PET base film and the PVA film were separated from each other with peel strength of 2.7N/2 cm, while holding the PET base film, such that a thin polarizer having a thickness of 4 to 4.5 μm was finally prepared.

Experimental Example 1

Comparison of Optical Characteristics

Single transmittance (Ts), cross transmittance (Tc), degree of polarization (DOP), single color (a, b), and cross color (a, b) were measured using a JASCO V-7100 Spectrophotometer, with respect to the thin polarizer prepared by Inventive Example and the thin polarizer prepared by Comparative Example 2.

TABLE 1

| Classification | Ts(%) | Tc(%) | DOP(%) | Single Color | | Cross Color | |
|---|---|---|---|---|---|---|---|
| | | | | a | b | a | b |
| Inventive Example | 42.55 | 0.0647 | 99.8275 | −0.03 | 2.05 | 2.40 | −1.41 |
| Comparative Example 2 | 34.97 | 0.1259 | 99.4971 | −0.07 | 0.56 | 2.12 | −3.01 |

According to [Table 1], although Inventive Example had higher transmittance (Ts) than that of Comparative Example 2, it exhibited the degree of polarization (DOP) higher than that of Comparative Example 2. Therefore, it could be confirmed that the Inventive Example had optical performance superior than that of Comparative Example 2.

Meanwhile, in the case of preparing a thin polarizer using a coating method under manufacturing process conditions the same as those of Inventive Example as in Comparative Example 1, the coated PVA film was taken off, thereby leading to an inability to prepare a thin polarizer, as illustrated in Comparative Example 2. In the case of Comparative Example 2 in which a boric acid was added in swelling and dyeing processes and a stretching temperature was increased, a PVA film could be prepared using the coating method, but a deterioration in transmittance of a polarizer was present, due to an increase in the degree of crosslinking in accordance with the addition of the boric acid prior to the stretching. Thus, a polarizer having a degree of polarization of 99.0% or more while having the transmittance of 40 to 45%, suggested in the embodiment of the present disclosure could not be prepared.

Comparative Example 3

A film laminate was prepared by stacking a PVA film having a thickness of 30 μm (M3000 grade manufactured by Nippon Gohsei) on both surfaces of a thermoplastic polyurethane base film having a thickness of 60 μm, using a PVA adhesive (containing 4 wt % of solid, product name: JC25, manufacturer: JAPAN VAM & POVAL Co., Ltd).

After the film laminate was swollen in a pure water solution at a temperature of 25° C. for 15 seconds, the film laminate was dyed in a solution having an iodine concentration of 0.3 wt % at 25° C. for 60 seconds. Then, after the film laminate was subjected to a cleaning process in a solution having a boric acid concentration of 1 wt % at 25° C. for 15 seconds, the film laminate was stretched at a magnification of 7 times in a solution having a boric acid concentration of 2.5 wt % at 52° C.

Figure 3:
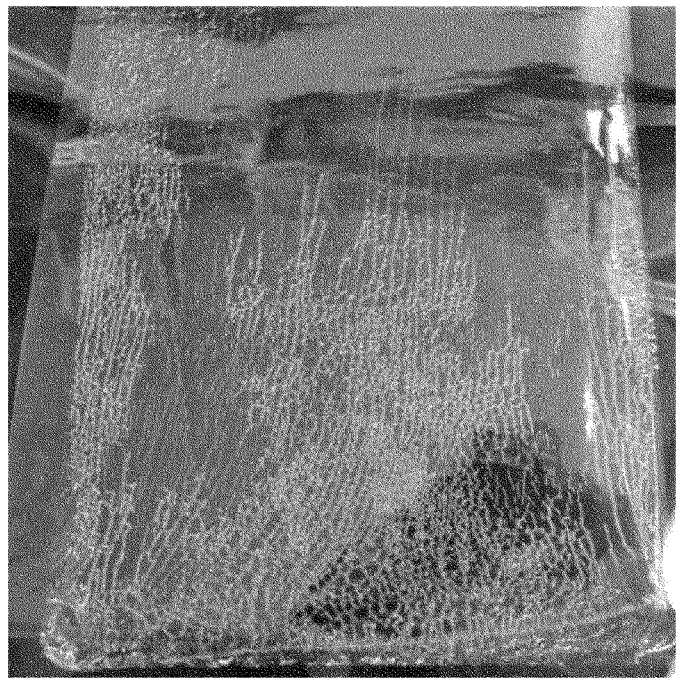
FIG. 3 is a photograph illustrating a surface state of a film laminate immediately after a base film and a polyvinyl alcohol (PVA) film according to Comparative Example 3 are attached.
Figure 4:
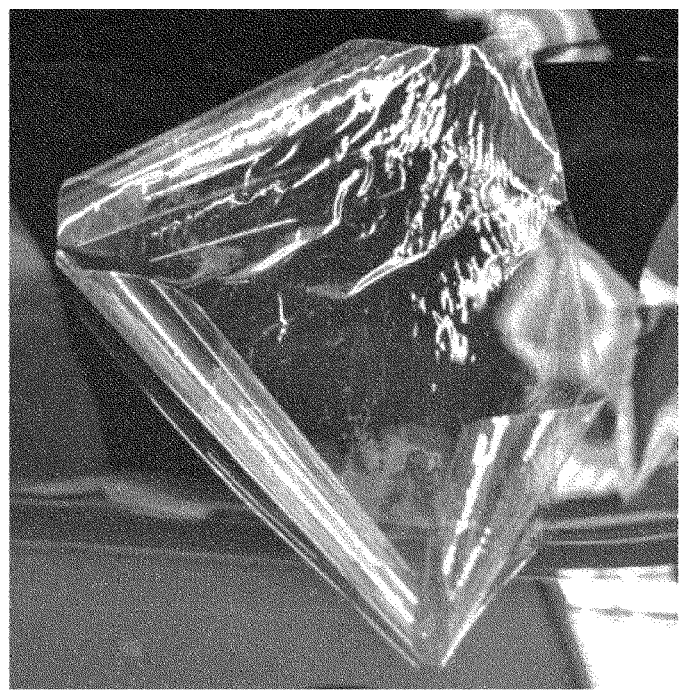
FIG. 4 is a photograph illustrating a curling phenomenon in the film laminate immediately after the base film and the polyvinyl alcohol (PVA) film according to Comparative Example 3 are attached.

However, in the case of the film laminate prepared by attaching the base film with the PVA film, using the adhesive described above, a considerable amount of fine wrinkles in the form of cracks occurred in a surface of the film laminate immediately after the attachment. Curling occurred, such that a curling phenomenon was generated in the film laminate. FIG. 3 illustrates a surface state of the film laminate immediately after the PVA film was attached to the base film with the PVA adhesive. FIG. 4 illustrates a curling phenomenon in the film laminate. In a case in which wrinkles were generated in a film surface and the curling phenomenon was generated in the film laminate described above, the breakage occurrence rate may be increased during a stretching process.

Figure 5:
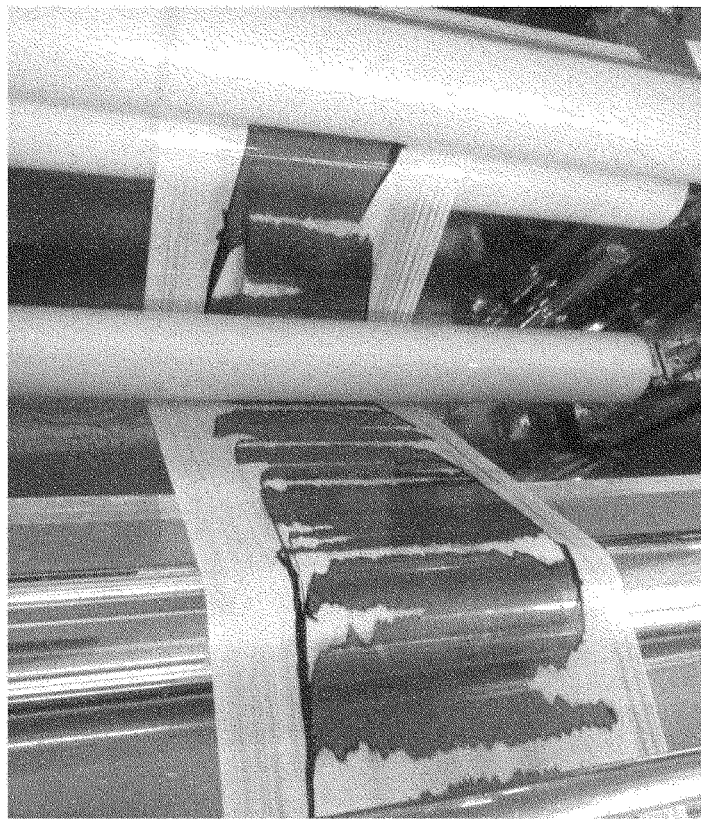
FIG. 5 is a photograph illustrating a state of the film laminate according to Comparative Example 3 during a cleaning process.
Figure 6:
FIG. 6 is a photograph illustrating a state of the film laminate according to Comparative Example 3 during a stretching process.

FIGS. 5 and 6 are photographs respectively showing a state of the film laminate according to Comparative Example 3 during respective cleaning and stretching processes. As can be seen in FIGS. 5 and 6, in the film laminate according to Comparative Example 3, the PVA film was broken during the cleaning and stretching processes. The occurrence of breakage is considered due to stress generated by forcibly bonding the base film and the PVA film that have different swelling rates, to each other with the adhesive.

Comparative Example 4

A film laminate was prepared by stacking a PVA film having a thickness of 30 μm (M3000 grade manufactured by Nippon Gohsei) on both surfaces of a thermoplastic polyurethane base film having a thickness of 60 μm, using a PVA adhesive (containing 4 wt % of solid, product name: JC25, manufacturer: JAPAN VAM & POVAL Co., Ltd).

After the film laminate was swollen in a pure water solution at a temperature of 25° C. for 15 seconds, the film laminate was dyed in a solution having an iodine concentration of 0.3 wt % at 25° C. for 60 seconds. Then, after the film laminate was subjected to a cleaning process in a solution having a boric acid concentration of 1 wt % at 25° C. for 15 seconds, the film laminate was stretched at a magnification of 6 times in a solution having a boric acid concentration of 2.5 wt % at 52° C. After the stretching, the film laminate was subjected to a complementing process in a solution having a KI concentration of 5 wt %, and then was dried in an oven at 80° C. for 5 minutes. Thereafter, the polyurethane base film and the PVA film were separated from each other with peel strength of 2.3N/2 cm, while holding the polyurethane base film, such that a thin polarizer having a thickness of 8.7 μm was finally prepared.

Figure 7:
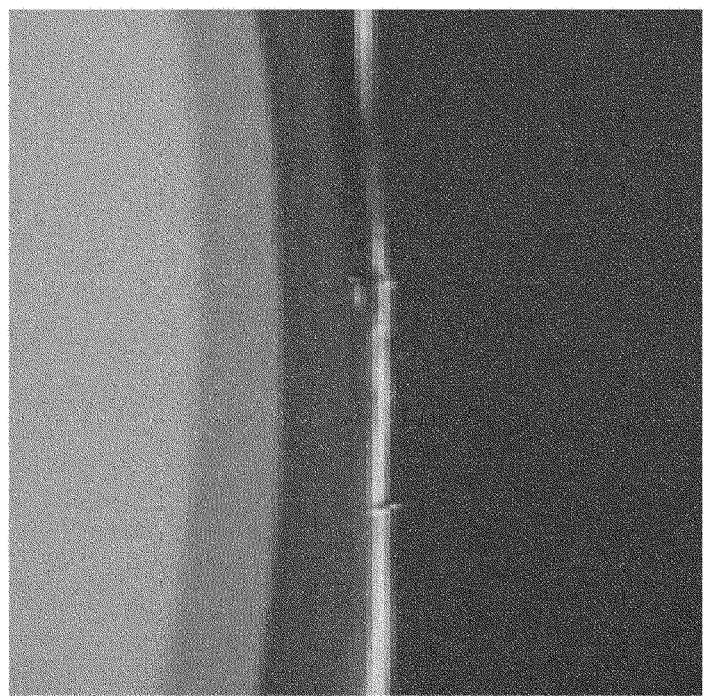
FIG. 7 is a photograph illustrating a curling phenomenon in an edge of a film laminate according to Comparative Example 4 after stretching.
Figure 8:
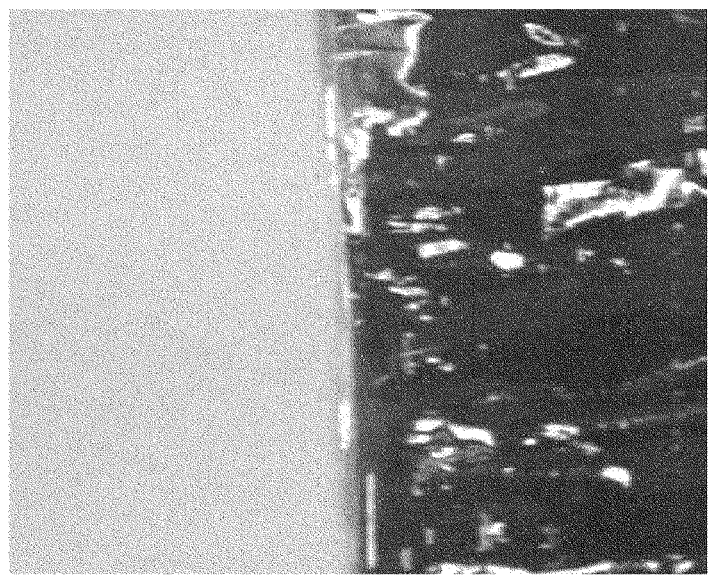
FIG. 8 is a photograph illustrating a state of a film laminate according to Inventive Example after stretching.

In this case, although breakage was not generated in the stretching and cleaning processes, a phenomenon in which an edge of the film laminate curled was generated. FIG. 7 illustrates a state of the film laminate according to Comparative Example 4 after the stretching thereof. Meanwhile, FIG. 8 illustrates a state of the film laminate according to Inventive Example after the stretching thereof. As illustrated in FIGS. 7 and 8, the curling of the edge of the film laminate according to Comparative Example 4 occurred after stretching, while the curling phenomenon was not generated in the film laminate according to Inventive Example after the stretching thereof.

EXPLANATION OF REFERENCE NUMERAL

H: Holder
A: Polyvinyl alcohol (PVA) film
B: Base Film
MD: Longitudinal stretching direction

The invention claimed is:
1. A method for preparing a thin polarizer, comprising:
forming a film laminate by attaching a non-stretched polyvinyl alcohol (PVA) film having a thickness of 10 to 60 µm to at least one surface of a non-stretched base film, using attractive force therebetween;
stretching the film laminate such that the thickness of the PVA film is 10 µm or less; and
wherein the attractive force between the non-stretched base film and the non-stretched PVA film is 0.1 to 2N/2 cm.
2. The method of claim 1, wherein the base film is a polymer film having a maximum stretching magnification of 5 or more times.
3. The method of claim 1, wherein the base film is at least one selected from a group consisting of a high density polyethylene film, a polyurethane film, a polypropylene film, a polyolefin film, an ester-based film, a low density polyethylene film, a co-extruded film of high density polyethylene and low density polyethylene, a copolymer resin having ethylene vinyl acetate contained in high density polyethylene, an acrylic film, a polyethylene terephthalate film, a polyvinyl alcohol film and a cellulose film.
4. The method of claim 1, wherein the stretching of the film laminate is performed through wet stretching.
5. The method of claim 1, wherein the stretching of the film laminate is performed at a temperature of 20° C. to 85° C. at a stretching magnification of 5 to 15 times.
6. The method of claim 1, further comprising: dyeing the film laminate with at least one of iodine and a dichroic dye, prior to the stretching.
7. The method of claim 1, wherein the stretching of the film laminate is performed in an aqueous boric acid solution.
8. The method of claim 1, further comprising: separating the PVA film from the base film, after the stretching of the film laminate.
9. The method of claim 8, wherein the separating of the PVA film from the base film is performed by applying peeling strength of 2N/2 cm.

* * * * *